Sept. 28, 1971          S. GREENSPAN          3,608,278
APPARATUS FOR FILTERING AND COLLECTING SOLID
MATTER FROM A SMOKE FLOW
Filed July 22, 1969          2 Sheets-Sheet 1
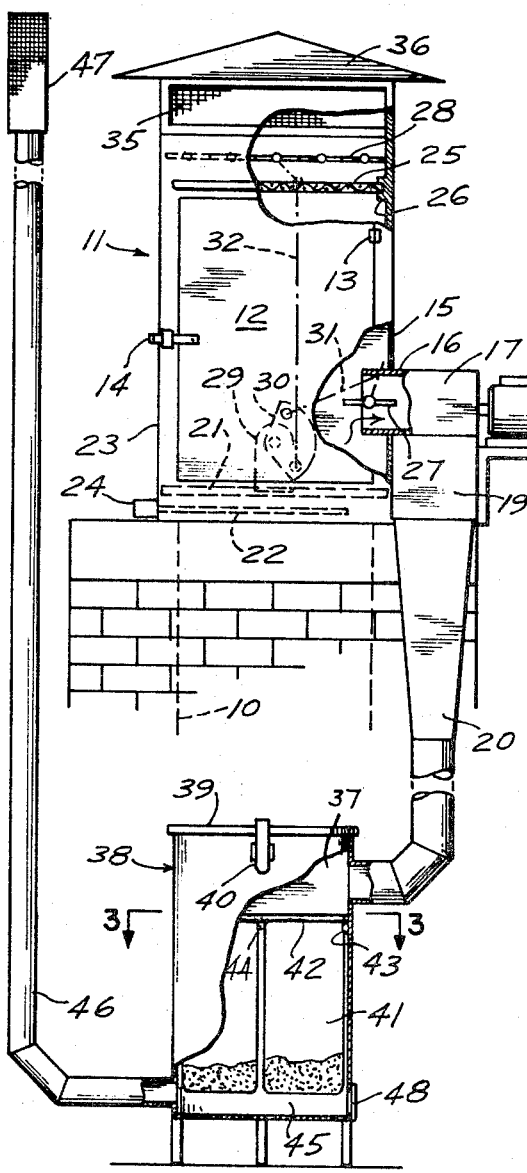
FIG. 1
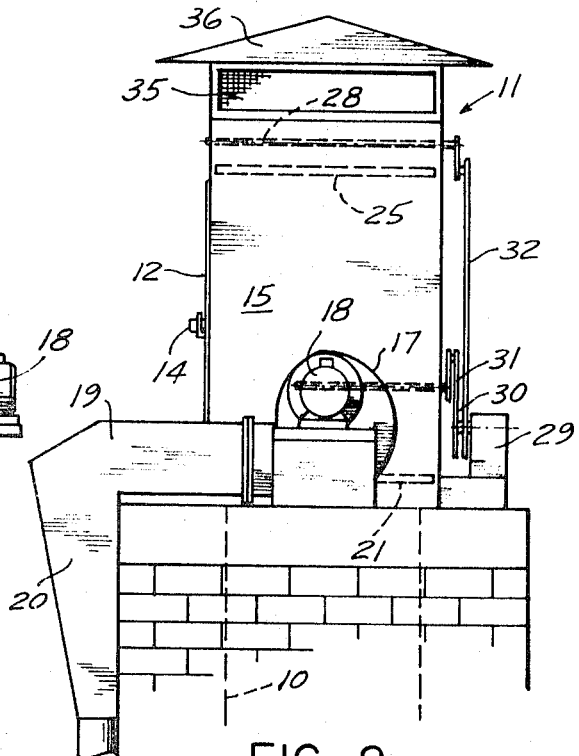
FIG. 2
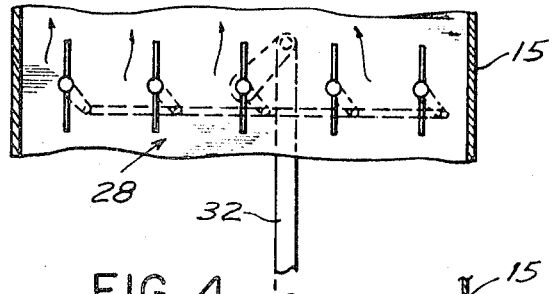
FIG. 4
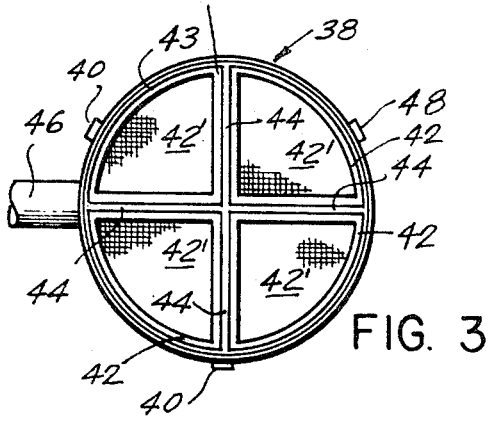
FIG. 3
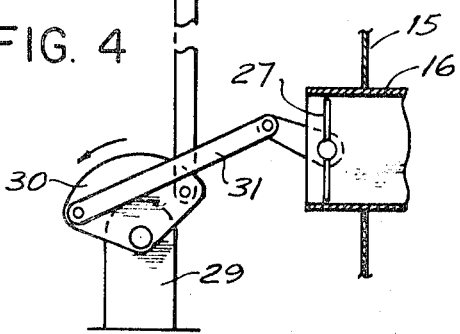
INVENTOR.
SAUL GREENSPAN
BY
ATTORNEY United States Patent Office 3,608,278
Patented Sept. 28, 1971

3,608,278
APPARATUS FOR FILTERING AND COLLECTING SOLID MATTER FROM A SMOKE FLOW
Saul Greenspan, 1335 E. 38th St., Brooklyn, N.Y. 11210
Continuation-in-part of application Ser. No. 604,364, Dec. 23, 1966. This application July 22, 1969, Ser. No. 843,310
Int. Cl. B01d 46/04, 46/10, 46/86
U.S. Cl. 55—212                                    9 Claims

ABSTRACT OF THE DISCLOSURE

A device having a housing fitted upon a chimney or other smoke outlet, the housing containing a heater or burner, a grate and one or more smoke filters past which the outgoing smoke flows. A suction blower exerts suction in a direction transverse to the smoke flow to thereby draw off any solid material such as soot, residue, flakes, ashes or the like created by the combustion or incineration and entrained in the smoke. The suction causes the solid material to be delivered into a collection chamber to which the outlet of the blower is connected. The heater or burner reduces large particles of the solid material to smaller size to enable them to be readily carried off by the exerted suction. Suitable louver and damper means are further providing for increasing efficiency of forced circulation as is apparatus for making the forced flow direction reversible and alternating the direction thereof as a means of self-cleansing of the filters of the system.

---

The present invention relates to filtering and collection means for the soot, residue, ashes, particles and solids resulting from incineration or combustion, the residue being filtered and collected from the outgoing flow of smoke in which it was entrained and is a continuation-in-part of copending U.S. Ser. No. 604,364 filed by applicant Dec. 23, 1966, now abandoned.

At the present time, many of our larger cities are plagued with so-called "smog," the production of which is attributed at least to a substantial extent to the residue from combustion taking place in furnaces and incinerators. It is, therefore, a primary object of the present invention to provide an effective apparatus for not only aiding in a more complete incineration or combustion of the solid matter entrained in a smoke outflow, but to capture and isolate most, if not all, of such material as is borne by the smoke and deposit it into a collection receptacle. As a result, the smoke reaching the atmosphere will be free from thhe usual entrained particles which at least partly create the objectionable smog.

With this and other objects to be hereinafter set forth in view, I have devised the arrangement of parts to be described and more particularly pointed out in the claims appended hereto.

In the accompanying drawings, wherein illustrative embodiments of the invention are disclose:

FIG. 1 is a front view in elevation of the outdoor or high-end portion of the combustion or incinerator system partially broken.

FIG. 2 is a side view in elevation of the same.

FIG. 3 is an enlarged plan view of FIG. 1 taken across line 3—3 of FIG. 1.

FIG. 4 is a fractional view in elevation of the damper equipment means shown in FIG. 1 in an alternate position of operation.

Figure 5:
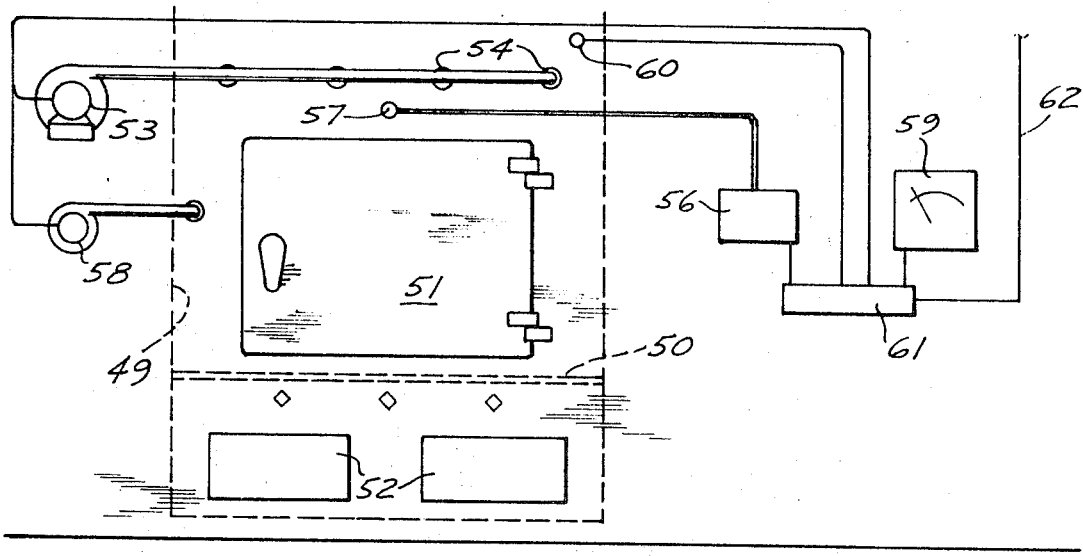
FIG. 5 is a schematic front view in elevation of the indoor or low-end of the incinerator or combustion system.

Referring to the structure shown in FIGS. 1–4, a housing 11 having an access door 12 hinged at 13 and latched at 14 is mounted on top of an incinerator stack 10. Housing 11 has an opening in side wall 15 for a duct 16 serving as an intake to an induced draft fan 17 powered by motor 18. The delivery side of fan 17 leads into duct 19 and a down-corner 20.

At the bottom of housing 11 is a fixed grid 21 extending to the four walls thereof and beneath said grid is a heater such as an electric heater (Calrod) 22 extending from housing wall 23 through which the heater leads are brought to a wiring box 24. At the top of housing 11 is a wire screen 25 supported on slides for easy removal.

The structure thus far described is embodided in applicant's copending U.S. application, Ser. No. 604,364 filed Dec. 23, 1966 and is incorporated herein by reference. Modifications thereof are herein set forth.

At the entrance to duct 19 there is now a damper 27, while at the top of housing 11 a louver 28 is added. As generally shown in FIG. 1 and more clearly in FIG. 4, a gear motor 29 operates the damper and louver through crank 30 and arms 31 and 32. Motor 29, equipped with suitable limit switches, operates from the position as seen in FIG. 1 to the position as seen in FIG. 4 and back. It is therefore seen that air can move either into duct 19 or out through louver 28. For this purpose, operation of motor 29 is suitably interlocked with motor 18 so that duct 19 is open when the fan 17 is running and is closed when the said fan stops running. As shown, housing 11 is closed at the top by screens (four in number) beneath the weather hood 36, and designated 35.

Duct down-corner 20 connects to a clear space 37 in the upper part of the particle and dust receptacle 38 provided as shown with cover 39 secured thereto as by toggle latches 40, the lower part of the said receptacle also being provided with a clear space 45. Intermediate said space areas 37 and 45 is arranged a complex or series of four quadrant-shaped filter bags 41, each having a peripheral flange 42 at the top thereof. If desired, a screen 42' may be secured across the flange of each of said bags. Each integral unit of bag 41 is removably supported in place on parts of a ring 43 by flange 42 and on parts of quadrant arms 44 provided on said ring.

Below bags 41 space 45 leads to a stack 46 extending above hood 36, said stack terminating in a spark arrester 47. Access to space 45 below bags 41 may be made as by a door 48 while the bags are in place.

By reference to FIG. 5, it is generally seen that stack 10 bottoms on a fire-box 49 while shaker grate 50 supports the waste to be burned. After burning, the waste remaining on the grate is removed at door 51. Material and ash that pass through the grate 50 are removed at clean-out doors 52.

Although waste can be deposited directly into the firebox 49, it is normally deposited by opening access doors located at each floor of a multi-level building.

Conventional furnace control equipment known in the art and indicated generally in FIG. 5 are air blower 53 bringing air to inlets 54, draft control 56 piped to draft take-off 57, igniter 58 and indicating temperature controller 59 connected to temperature probe 60, all of said equipment being localized and wired at connection box 61. Electrical connections to fan motor 18, damper and louver motor 29 and heater 22 are brought out at conduit 62.

In operation and by way of example, but not limiting in use, the following relates to a multi-level building having incinerator access door at each floor. A fixed time period is set for burning such as between 9 and 11 a.m. each day. When the incinerator is not in burning operation, the access doors are available for disposal of garbage. However, during the burning operation the access doors must suitably be secured against opening because the system is dependent upon an induced draft as for example by a solenoid-operated lock energized by a key-operated switch located near each access door.

After all doors are locked, the burner of the incinerator is started up in the usual manner. The start-up energizes motor 29 (putting the damper 27 in closed position and louver 28 in open position as shown in FIG. 1), fan motor 18 and heater 22. The function of louver 28 now becomes apparent in that fan 17 pulls air from stack 10 only. The equipment operates more efficiently than in applicant's said copending U.S. Ser. No. 604,364 except that now larger particles are caught on screens 42 when used and smaller particles in each of the four bags 41. Still smaller particles accumulate on the bottom of space 45.

It should be noted that due to the draft and turbulence pattern set up in space 37, it has been found that there is a differential in the amount of settling out in each of the bags 41. This can result in economies by having to replace one bag long before any of the other three on a regular maintenance schedule. On a less regular schedule, replacement may become two out of four. Or the replacement can wait until all four bags require replacement. If a bag is not immediately handy, the four bags may be shifted in the quadrants dependent upon the relative rates of fill.

Fines in space 45 are removable as by a portable vacuum cleaner inserted at door 48 while spark arrester 45 serves to cool any particles that may be carried up stack 46 accidentally as for example by the jarring of dust receptacle 38.

When burning is completed and the system is shut down damper 27 is in closed position and the louver 28 in open position as shown in FIG. 4. Screen 25 functions as in applicant's said U.S. Ser. No. 604,354, while screens 35 serve to retain larger particles and cool smaller particles which may accidentally be carried upwardly by convention in a heated or ignited state, as for example a piece of paper thrown in at one of the doors.

Damper 27, in keeping duct 16 closed, insures that fines and dust carried up stack 10 by convection or blown in through screens 35 by the wind do not build up in the blower casing between firing periods. The reason for this is that the ducts and blower used herein are designed for best service when moving material during normal operation as against removing material that accumulates and adheres during idle periods.

Figure 6:
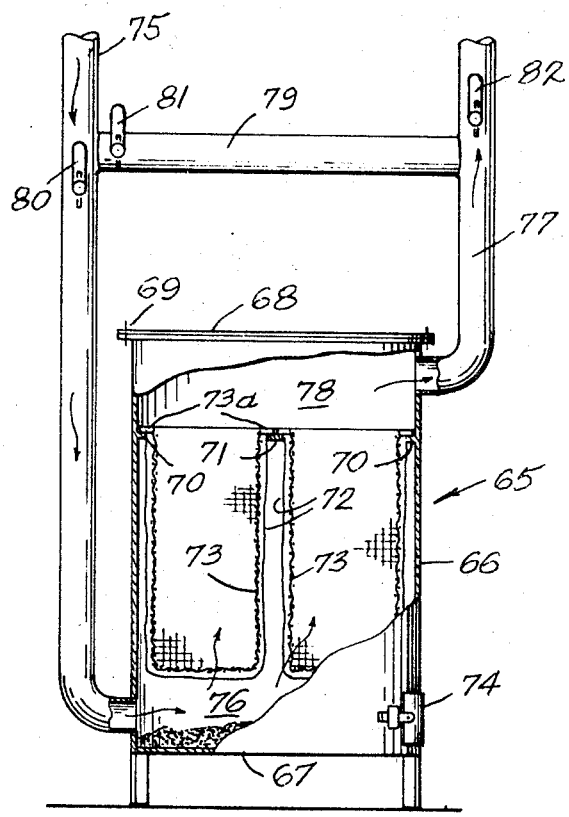
FIG. 6 is a view in elevation, partially broken, of a modified form of solid particle collection system at the discharge end of an incinerator.
Figure 7:
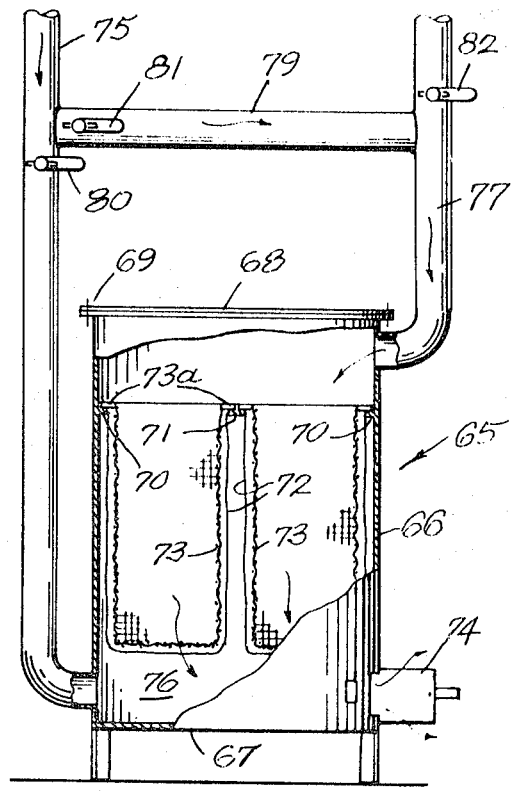
FIG. 7 is a view similar to FIG. 6 showing the reversed mode of operation of the system for cleaning purposes.

In the embodiment of the system shown in FIGS. 6 and 7, the dust receptacle 65 comprises a cylindrical wall 66 and a bottom closure surface 67. Closing the receptacle at the top is a cover 68 with accessible bolts or latches generally at 69, and below the receptacle top and on the inside is a ring 70 bridged by two cross-members 71, said ring being welded to wall 66. The assembly of ring and cross-members forms four full openings of 90° sector areas for receiving four assemblies of an effective filtering element as nested filter bags 72 and screens 73, the bags being outside the screens. Each bag and screen is separately ringed or flanged at the upper perimeter as generally indicated at 73a for support and easy accessibility for lift out from ring 70 and cross-member supports 71.

At the lower end of wall 66 an access door 74 serves optionally both as a clean-out and as an air discharge as will now be described. Pipe or duct 75 connected to blower 17 (FIGS. 1 and 2) at its upper end leads to lower space 76 in receptacle 65 and below the filter bags 72 and screens 73. A pipe, duct or stack 77 is connected to the upper space 78 in receptacle 65 and leads upwardly to the atmosphere.

Bridging pipes or ducts 75 and 77 is a cross-pipe or duct 79 spaced as low as possible above the top of receptacle 65 as will give access to cover 68 and thus allow accessibility to damper-type closures 80, 81 and 82 set into pipes or ducts 75, 79 and 77 respectively. To avoid air-duct turbulence, these closures are installed as near as practical to the pipe junctures.

In operation of the system herein modified as by structure of FIGS. 6 and 7 and during the burning period, air carries solid particles down pipe, or duct 75 into space 76 where impeded by filtering means as filter bags 72, the solid particles drop on the receptacle bottom 67. The cleansed air continues upwardly through the filter bags 72, past screens 73 and into upper space or chamber 78 where said air is forced out through pipe or duct 77 to the atmosphere. Inspection of FIG. 6 shows that for burning, closure 80 in vertical position is open, closure 81 in vertical position is closed and closure 82 in vertical position is open.

As the movement of the air in lower space 76 is resisted by the filter bags, it becomes apparent that screens 73 serve the function of preventing distortion and/or collapse of filter bags 72.

Periodically, as it becomes necessary to clean the system shown in FIG. 6, the need for repetitive bag and/or screen removal is obviated or reduced. Bag removal is time consuming and will often be neglected or ignored depending upon the reliability of those responsible for cleaning the system. Thus, when the closures 80, 81 and 82 are all turned to horizontal position at which time closures 80 and 82 are in closed condition while 81 is in open condition (FIG. 7), space 76 may be cleaned out at door 74 when only blower 17 is turned on in the system. Air now passes down pipe or duct 75 across pipe 79, down pipe or duct 77, through space 78, through filter bags 72 and out of door 74.

It is to be noted that filters afforded by the bags 71 clog from the positive air side first. As is commonly experienced, air reversal will maintain filter efficiency for a much longer period before it becomes necessary to remove a filter for washing or replacement.

Under the system of FIG. 6, it is not necessary to clean space 76 thoroughly. A bag held close to the opening of door 74 as above stated will catch much of the remaining particles disturbed by the downward air movement when the blower 17 is turned on.

In general, the reversal of air flow disturbs, loosens and therefore helps the removal of dirt adhering to the pipe or duct surfaces. In the structure described, these surfaces are in the lower part of pipe or duct 77, in space 78, screens 73 and space 76.

A novel means for detecting the need for filter removal presents itself in the system by listening to fan 17 and motor 18 during air reversal as described while switching closure 82 from one position to the other, back and forth and noting the laboring of the motor compared to its short circuit operation through pipe 79.

I wish it is understood that minor changes and variations in the integration, location, size and material of parts of the invention may all be resorted to without departing from the scope of the appended claims.

I claim:

1. An apparatus applicable to the atmospheric end of a smoke stack for incinerators and adapted to filter and collect solid matter entrained in the smoke stream, comprising: a housing aligned with and adapted to be fitted over the end of the smoke stack and open to the atmosphere at the top thereof, a heater at the lower end of the housing for ignition of combustible material carried in the draft of the smoke stream, a filter in the housing at the upper end, a receptacle to collect and store said solid matter, a duct communicating with said housing intermediate the ends thereof and communicating with said receptacle, a stack communicating with the receptacle at one end and open to the atmosphere at the other end, filter means within the receptacle intermediate the junctures of said duct and stack with said receptacle, blower means within the duct to draw the smoke stream with entrained solid matter toward said receptacle through the said filter means within the receptacle for entrapping said solid matter and through said stack to the atmosphere.

2. An apparatus as set forth in claim 1 wherein said housing is provided with louver means for controlling communication with the atmosphere and wherein said duct is provided with damper means adjacent the housing for controlling communication with said housing during operative and inoperative periods of said apparatus, and common means for control of said blower and damper means.

3. An apparatus as set forth in claim 2 wherein said duct and stack outside of the housing are provided with bridging duct means, and a controllable damper element in each of the said duct, stack and bridging duct disposed adjacent the juncture of said duct and stack with the bridging duct whereby the direction of the smoke stream inside the receptacle is reversible for unclogging the filter means within said receptacle.

4. An apparatus as set forth in claim 1 wherein the filter means comprises a plurality of filter bags within the receptacle, and means in the receptacle for removably mounting said bags.

5. An apparatus as set forth in claim 2 wherein the filter means comprises a plurality of filter bags within the receptacle, and means in the receptacle for removably mounting said bags.

6. An apparatus as set forth in claim 3 wherein the filter means comprises a plurality of filter bags within the receptacle, and means in the receptacle for removably mounting said bags.

7. An apparatus as set forth in claim 3 wherein the housing is open at the top to the atmosphere through screening means.

8. An apparatus as set forth in claim 7 wherein the stack at the atmospheric end is open thereto through screening means.

9. An apparatus as set forth in claim 2 wherein said duct communicates with the said receptacle at the lower end and said stack communicates with the said receptacle at the upper end, said duct and stack outside of the receptacle being provided with bridging means, and a controllable damper element in each of the said duct, stack and bridging duct disposed adjacent the juncture of said duct and stack with the bridging duct whereby the direction of the smoke stream inside the receptacle is reversible for unclogging the filter means within said receptacle.

References Cited
UNITED STATES PATENTS

| | | | |
|---|---|---|---|
| 133,984 | 12/1872 | Hawkes et al. | 110—120X |
| 296,791 | 4/1884 | Smith et al. | 23—2(C) |
| 476,176 | 5/1892 | Strouse et al. | 110—119 |
| 601,355 | 3/1898 | Paterson | 110—119X |
| 839,797 | 12/1906 | Wood | 55—S.A.UX |
| 2,835,775 | 5/1958 | Schlebusch | 209—238X |

FOREIGN PATENTS

| | | | |
|---|---|---|---|
| 903,890 | 2/1954 | Germany | 55—302 |

DENNIS E. TALBERT, Jr., Primary Examiner

U.S. Cl. X.R.

23—2 C, 288 F; 55—272, 283, 287, 288, 303, 315, 341, 343, 344, 350, 358, 372, 379, 385, 417, 418, 428, 466, 473, 481, 483, 484, 485, 529; 74—25; 98—59, 122; 110—8 R, 18 A, 119, 184; 266—15

UNITED STATES PATENT OFFICE
CERTIFICATE OF CORRECTION

Patent No. 3,608,278                    Dated    September 28, 1971

Inventor(s)    Saul Greenspan

It is certified that error appears in the above-identified patent
and that said Letters Patent are hereby corrected as shown below:

Column 3, line 12, "closed" should read -- open --; line
13, "open" should read -- closed --. Column 5, line 13,
"blower" should read -- louver --.

Signed and sealed this 1st day of August 1972.

(SEAL)
Attest:

EDWARD M. FLETCHER, JR.                ROBERT GOTTSCHALK
Attesting Officer                      Commissioner of Patents